(12) United States Patent
Okamoto et al.

(10) Patent No.: US 9,267,216 B2
(45) Date of Patent: Feb. 23, 2016

(54) METHOD FOR PRODUCING ALUMINUM FOIL

(75) Inventors: Atsushi Okamoto, Osaka (JP); Hiroyuki Hoshi, Osaka (JP); Setsuo Andou, Izumi (JP)

(73) Assignee: HITACHI METALS LTD., Tokyo (JP)

( * ) Notice: Subject to any disclaimer, the term of this patent is extended or adjusted under 35 U.S.C. 154(b) by 57 days.

(21) Appl. No.: 13/883,643

(22) PCT Filed: Nov. 10, 2011

(86) PCT No.: PCT/JP2011/075996
§ 371 (c)(1),
(2), (4) Date: May 6, 2013

(87) PCT Pub. No.: WO2012/063920
PCT Pub. Date: May 18, 2012

(65) Prior Publication Data
US 2013/0224589 A1    Aug. 29, 2013

(30) Foreign Application Priority Data

Nov. 11, 2010 (JP) .................................. 2010-252530
Dec. 27, 2010 (JP) .................................. 2010-290600

(51) Int. Cl.
| | |
|---|---|
| *C25D 3/44* | (2006.01) |
| *H01G 11/30* | (2013.01) |
| *H01M 4/66* | (2006.01) |
| *C25D 1/04* | (2006.01) |
| *C25D 5/50* | (2006.01) |
| *C25D 7/06* | (2006.01) |
| *H01G 9/00* | (2006.01) |
| *H01G 11/22* | (2013.01) |
| *H01G 11/84* | (2013.01) |
| *H01M 10/052* | (2010.01) |

(52) U.S. Cl.
CPC .. *C25D 3/44* (2013.01); *C25D 1/04* (2013.01); *C25D 5/50* (2013.01); *C25D 7/0614* (2013.01); *H01G 9/0032* (2013.01); *H01G 11/22* (2013.01); *H01G 11/30* (2013.01); *H01G 11/84* (2013.01); *H01M 4/661* (2013.01); *H01M 10/052* (2013.01); *Y02E 60/13* (2013.01); *Y10T 428/12431* (2015.01)

(58) Field of Classification Search
CPC ............. C25D 3/44; C35D 5/50; H01M 4/661
USPC ........................................... 205/237; 428/606
See application file for complete search history.

(56) References Cited

U.S. PATENT DOCUMENTS 5,041,194 A  *  8/1991  Mori et al. .................... 205/237

FOREIGN PATENT DOCUMENTS

| CN | 101685713 A | | 3/2010 |
|---|---|---|---|
| EP | 1134828 | * | 9/2001 |
| EP | 2500969 A1 | | 9/2012 |
| JP | H1-104791 | | 4/1989 |
| JP | H8-501831 | | 2/1996 |
| JP | 11097032 | * | 4/1999 |
| JP | 2001-516812 A1 | | 10/2001 |
| JP | 2005-121825 A1 | | 5/2005 |
| JP | 2006-161154 A | | 6/2006 |
| JP | 2007291490 | * | 9/2007 |
| JP | 4133728 B2 | | 8/2008 |
| JP | 2010-90414 A1 | | 4/2010 |
| JP | 2010232171 A | | 10/2010 |
| WO | 9408071 A1 | | 4/1994 |
| WO | WO 2010/044305 A1 | | 4/2010 |
| WO | 2010100924 A1 | | 9/2010 |

OTHER PUBLICATIONS

JP 2007291490—Translation.*
International Search Report for International Application No. PCT/JP2011/075996 dated Feb. 21, 2012.
Extended European Search Report issued on Jul. 17, 2015 for the corresponding European patent application No. 11840479.7.
First Office Action issued on Dec. 23, 2014 corresponding to Chinese patent application No. 201180054163.2.
Non Patent Document entitled: "NMS".

* cited by examiner

*Primary Examiner* — Ladan Mohaddes
(74) *Attorney, Agent, or Firm* — Kratz, Quintos & Hanson, LLP

(57) ABSTRACT

A method for producing an aluminum foil of the present invention is characterized in that an aluminum film is formed on a surface of a substrate by electrolysis using a plating solution containing at least (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), then the film is separated from the substrate to obtain an aluminum foil, and the obtained aluminum foil is subjected to a heat treatment.

9 Claims, 10 Drawing Sheets

Heat-Treated Aluminum Foil of Example 1

Commercially Available Rolled Aluminum Foil

METHOD FOR PRODUCING ALUMINUM FOIL

TECHNICAL FIELD

The present invention relates to a method for producing an aluminum foil. More specifically, the present invention relates to a method for producing an aluminum foil by electrolysis, which can be used, for example, as a positive electrode current collector for electrical storage devices such as lithium ion secondary batteries and supercapacitors (electrical double-layer capacitors, redox capacitors, lithium ion capacitors, etc.).

BACKGROUND ART

It is a well known fact that lithium ion secondary batteries, which have high energy density and whose discharge capacity does not significantly decrease, have been used for a power source for mobile tools such as mobile phones and laptop computers. In recent years, with the miniaturization of mobile tools, there also is a demand for the miniaturization of lithium ion secondary batteries to be mounted therein. In addition, with the development of hybrid cars, solar power generation, and other technologies as a measure to prevent global warming, etc., the application of supercapacitors having high energy density, such as electrical double-layer capacitors, redox capacitors, and lithium ion capacitors, has been increasingly expanding, and there is a demand for a further increase in their energy density.

An electrical storage device, such as the lithium ion secondary battery or the supercapacitor, has a structure in which, for example, a positive electrode, a negative electrode, and a separator made of a polyolefin or the like between them are arranged in an organic electrolytic solution containing a fluorine-containing compound, such as $LiPF_6$ or $NR_4 \cdot BF_4$ (R is an alkyl group), as an electrolyte. Generally, the positive electrode includes a positive electrode active material, such as $LiCoO_2$ (lithium cobalt oxide), $LiMn_2O_4$ (lithium manganese oxide), $LiFePO_4$ (lithium iron phosphate), or active carbon, and a positive electrode current collector, while the negative electrode includes a negative electrode active material, such as graphite or active carbon, and a negative electrode current collector, and, with respect to the shape, the electrodes are each obtained by applying the active material to the surface of the current collector and forming the same into a sheet. The electrodes are each subjected to high voltage and also immersed in the highly corrosive organic electrolytic solution that contains a fluorine-containing compound. Accordingly, materials for the positive electrode current collector, in particular, are required to have excellent electrical conductivity together with excellent corrosion resistance. Under such circumstances, currently, aluminum, which is a good electrical conductor and forms a passive film on the surface to offer excellent corrosion resistance, is almost 100% used as the material for a positive electrode current collector (as materials for the negative electrode current collector, copper, nickel, or the like can be mentioned).

One method for providing the electrical storage device with smaller size and higher energy density is to thin a current collector that constitutes a sheet-shaped electrode. Currently, an aluminum foil having a thickness of about 15 to 20 μm produced by rolling is generally used as the positive electrode current collector. Therefore, the object can be achieved by further reducing the thickness of such an aluminum foil. However, it is difficult to further reduce the foil thickness by rolling on an industrial production scale.

A possible aluminum foil production method to replace rolling is a method that produces an aluminum foil by electrolysis. The production of a metal foil by electrolysis is performed, for example, by forming a metal film on the surface of a substrate such as a stainless steel plate by electroplating, followed by the separation of the film from the substrate. Such production is well known as a method for producing a copper foil, for example. However, aluminum is an electrochemically base metal, and thus electroplating is extremely difficult. Therefore, it is not easy to produce an aluminum foil by electrolysis. Patent Document 1 discloses, as a method for producing an aluminum foil by electrolysis, a method that uses an electrolytic bath containing 50 to 75 mol % aluminum chloride and 25 to 50 mol % an alkylpyridinium chloride or an electrolytic bath prepared by adding an organic solvent to such a bath. However, in these methods, the plating solution has an extremely high chlorine concentration. This leads to a problem in that during a plating treatment, chlorine contained in the plating solution reacts with moisture in the ambient to produce hydrogen chloride gas, causing the corrosion of the equipment. Therefore, it is necessary to take a measure to prevent the production of hydrogen chloride gas or a measure to protect the equipment from corrosion due to the produced hydrogen chloride gas. In addition, the method described in Patent Document 1 also has a problem in that the applicable current density is at most about 2 $A/dm^2$, and thus the film formation rate is low (a further increase in the applied current density causes the decomposition of the plating solution, etc., making it impossible to stably perform a plating treatment). The addition of an organic solvent, such as benzene or toluene, to the plating solution is expected to improve the film formation rate. However, these organic solvents have high toxicity and high inflammability. Because of such risks, it must be said that the addition of such organic solvents to a plating solution is problematic in terms of the ease of liquid waste disposal and safety.

In addition, even when a thin aluminum foil can be obtained by electrolysis, to be thin is not the only thing required for an aluminum foil for use as a positive electrode current collector. During the electrode manufacturing process, the foil is tensioned. In addition, during the drying process after the application of a positive electrode active material to the surface of the foil, the foil is exposed to a high temperature of 100° C. or more. Therefore, an aluminum foil for use as a positive electrode current collector has to have excellent tensile strength, and the strength has to be stably maintained even after exposure to high temperatures. Further, in order for an aluminum foil to have excellent electrical conductivity, the purity is preferably as high as possible.

PRIOR ART DOCUMENTS

Patent Documents

Patent Document 1: JP-A-1-104791

SUMMARY OF THE INVENTION

Problems that the Invention is to Solve

Thus, an object of the present invention is to provide a method for producing a high-purity aluminum foil that allows a positive electrode current collector to be thinned for providing an electrical storage device with smaller size and higher energy density, and also has excellent tensile strength that is stably maintained even after exposure to high temperatures.

Means for Solving the Problems

The present inventors have conducted extensive research on the aluminum electroplating technology. As a result of the research, they have developed a method that uses a plating solution prepared by dissolving an aluminum halide in a dialkyl sulfone (JP-A-2008-31551). Then, the present inventors attempted to produce an aluminum foil by electrolysis using this plating solution. As a result, it has been found that the plating solution has a remarkably lower chlorine concentration than the plating solution used in the method described in Patent Document 1 and thus is advantageous in that hydrogen chloride gas is unlikely to be produced during a plating treatment, and also the plating solution allows for a stable plating treatment even when a current density of 8 A/dm$^2$ or more is applied thereto and thus is advantageous in that the film formation rate is high; however, the resulting aluminum film formed on the surface of a substrate is hard and has low ductility, and, accordingly, the film breaks upon separation from the substrate. Thus, the prevent inventors studied hard to solve this problem. As a result, it has been found that when a specific nitrogen-containing compound is added to the plating solution, a high-ductility, high-purity aluminum foil can be produced at a higher film formation rate. Further, it has also been found that when the aluminum foil thus obtained is subjected to a heat treatment, totally unexpectedly, tensile strength is improved, and the improved strength is stably maintained even after exposure to high temperatures.

A method for producing an aluminum foil of the present invention accomplished based on the above findings is, as defined in claim 1, characterized in that an aluminum film is formed on a surface of a substrate by electrolysis using a plating solution containing at least (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), then the film is separated from the substrate to obtain an aluminum foil, and the obtained aluminum foil is subjected to a heat treatment.

A production method as defined in claim 2 is characterized in that in the production method according to claim 1, the heat treatment is performed at 80 to 550° C.

A production method as defined in claim 3 is characterized in that in the production method according to claim 1 or 2, the dialkyl sulfone is dimethyl sulfone.

An aluminum foil of the present invention is, as defined in claim 4, characterized by being produced by the method of any one of claims 1 to 3.

An aluminum foil as defined in claim 5 is characterized in that in the aluminum foil according to claim 4, it has an aluminum content of 97.00 to 99.95 mass %, S and Cl contents of 1.50 mass % or less each, and a thickness of 1 to 15 μm.

An aluminum foil as defined in claim 6 is characterized in that in the aluminum foil according to claim 4 or 5, it has a crystal orientation such that the ratio of the X-ray diffraction intensity of a (111) plane to the X-ray diffraction intensities of other crystal planes is 2.5 or more with respect to a surface of the foil.

A positive electrode current collector for electrical storage devices of the present invention is, as defined in claim 7, characterized by comprising the aluminum foil of claim 4.

An electrode for electrical storage devices of the present invention is, as defined in claim 8, characterized by comprising an electrode active material supported on the aluminum foil of claim 4.

An electrical storage device of the present invention is, as defined in claim 9, characterized by comprising the electrode for electrical storage devices of claim 8.

Effect of the Invention

The present invention enables the provision of a method for producing a high-purity aluminum foil that allows a positive electrode current collector to be thinned for providing an electrical storage device with smaller size and higher energy density, and also has excellent tensile strength that is stably maintained even after exposure to high temperatures.

BRIEF DESCRIPTION OF THE DRAWINGS

Similarly.

MODE FOR CARRYING OUT THE INVENTION

Figure 1:
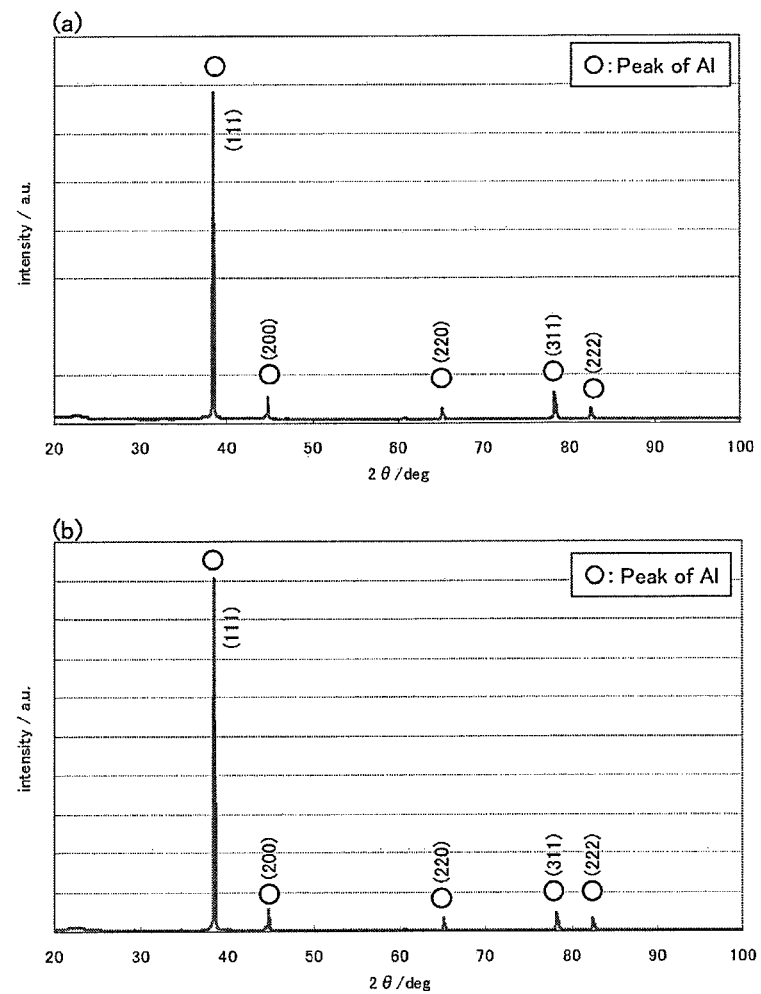
FIG. 1 shows X-ray diffraction charts showing the crystal orientation of an aluminum foil before a heat treatment in Example 1.

A method for producing an aluminum foil of the present invention is characterized in that an aluminum film is formed on a surface of a substrate by electrolysis using a plating solution containing at least (1) a dialkyl sulfone, (2) an aluminum halide, and (3) at least one nitrogen-containing compound selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation), then the film is separated from the substrate to obtain an aluminum foil, and the obtained aluminum foil is subjected to a heat treatment.

Examples of dialkyl sulfones to be contained in the plating solution used in the method for producing an aluminum foil of the present invention include those having a $C_{1-6}$ alkyl group (straight or branched), such as dimethyl sulfone, diethyl sulfone, dipropyl sulfone, dihexyl sulfone, and methylethyl sulfone. In terms of excellent electrical conductivity, availability, and the like, it is preferable to use dimethyl sulfone.

Examples of aluminum halides include aluminum chloride and aluminum bromide. In terms of minimizing the content of moisture in the plating solution, which inhibits the deposition of aluminum, it is preferable to use an anhydride as the aluminum halide.

Examples of ammonium halides usable as nitrogen-containing compounds include ammonium chloride and ammonium bromide. In addition, examples of primary to tertiary amines include those having a $C_{1-6}$ alkyl group (straight or branched), such as methylamine, dimethylamine, trimethylamine, ethylamine, diethylamine, triethylamine, propylamine, dipropylamine, tripropylamine, hexylamine, and methylethylamine. Examples of hydrogen halides include hydrogen chloride and hydrogen bromide. Examples of alkyl groups represented by $R^1$ to $R^4$ in a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation) include $C_{1-6}$ alkyl groups (straight or branched), such as a methyl group, an ethyl group, a propyl group, and a hexyl group. X may be a halide ion such as a chlorine ion, a bromine ion, or an iodine ion, or may also be $BF_4^-$, $PF_6^-$, or the like, for example. Specific examples of the compounds include tetramethylammonium chloride, tetramethylammonium bromide, tetramethylammonium iodide, and tetraethylammonium tetrafluoroborate. In terms of facilitating the formation of a high-ductility, high-purity aluminum film at a high film formation rate, preferred examples of the nitrogen-containing compounds include hydrochlorides of tertiary amines, such as trimethylamine hydrochloride.

The proportions of a dialkyl sulfone, an aluminum halide, and a nitrogen-containing compound added are preferably such that, for example, per 10 mol of dialkyl sulfone, the amount of aluminum halide is 1.5 to 4.0 mol, more preferably 2.0 to 3.5 mol, and the amount of nitrogen-containing compound is 0.01 to 2.0 mol, more preferably 0.05 to 1.5 mol. When the amount of aluminum halide added is less than 1.5 mol per 10 mol of dialkyl sulfone, this may cause the darkening of the formed aluminum film (a phenomenon called burning) or reduce the film formation efficiency. Meanwhile, when it is more than 4.0 mol, the solution resistance of the resulting plating solution may be so high that the plating solution generates heat and decomposes. In addition, when the amount of nitrogen-containing compound added is less than 0.01 mol per 10 mol of dialkyl sulfone, the addition may be unlikely to achieve its effects, that is, effects such as the improvement of the film formation rate owing to the achievement of a plating treatment at a high applied current density based on the improved electrical conductivity of the plating solution, the purity increase or ductility improvement in the aluminum film, etc. Meanwhile, when it is more than 2.0 mol, aluminum may not be deposited due to an essential change in the composition of the plating solution.

Incidentally, as additional components, conductive particles such as carbonaceous particles may also be added to the plating solution used in the method for producing an aluminum foil of the present invention. When conductive particles are added to the plating solution, and the conductive particles are thus dispersed and supported in an aluminum foil, the conductive particles dispersed and supported in the aluminum foil contribute to the reduction of the electrical surface resistance of the aluminum foil. In the case where carbonaceous particles as conductive particles are added to the plating solution, it is preferable that the carbonaceous particles have excellent electrical conductivity with a carbon content of 90 mass % or more. Examples thereof include furnace black particles, acetylene black particles, carbon black particles, black lead particles, and graphite particles, as well as carbon nanotubes and carbon nanofibers. The size of carbonaceous particles (depending on the shape, "size" means grain size, diameter, fiber diameter, length, etc., and may also mean the size of an aggregate in the case where the particles are present as aggregates) is preferably 1 nm to 100 μm, more preferably 1 nm to 15 μm, and still more preferably 3 nm to 5 μm. When the size of carbonaceous particles is less than 1 nm, they may be unlikely to contribute to the reduction of the electrical surface resistance of the aluminum foil. Meanwhile, when it is more than 100 μm, they may be difficult to uniformly disperse in the aluminum foil or the plating solution. In addition, it may be impossible to thin a positive electrode current collector. In order for an aluminum foil having carbonaceous particles dispersed and supported therein to have high strength, it is preferable that the size of the carbonaceous particles is 50% or less of the thickness of the aluminum foil. The form of the presence of carbonaceous particles dispersed and supported in an aluminum foil is not particularly limited. However, in order for the carbonaceous particles to effectively contribute to the reduction of the electrical surface resistance of the aluminum foil, it is preferable that at least some of the carbonaceous particles are protruded from the surface of the foil, for example, and thus exposed to the outside. In light of this, the size of carbonaceous particles may be greater than the thickness of the aluminum foil. However, in this case, in order for the carbonaceous particles to be firmly supported in the aluminum foil, it is preferable that their size is 150% or less of the thickness of the aluminum foil. The amount of carbonaceous particles dispersed in the plating solution is preferably $1 \times 10^{-4}$ to 1 g per 100 mL of the plating solution. When the amount dispersed is less than $1 \times 10^{-4}$ g per 100 mL of the plating solution, it may be impossible for the carbonaceous particles to be dispersed and supported in an amount sufficient to contribute to the reduction of the electrical surface resistance of the aluminum foil (e.g., 0.01 to 3.0 mass % of the aluminum foil having the carbonaceous particles dispersed and supported therein). Meanwhile, when the amount dispersed is more than 1 g per 100 mL of the plating solution, the viscosity of the plating solution may be so high that electroplating is difficult. It is preferable that the carbonaceous particles are dispersed in the plating solution while thoroughly stirring the plating solution so that the carbonaceous particles are uniformly dispersed in the solution and thus uniformly dispersed and supported in the aluminum foil. It is also possible to apply ultrasonic waves as required. Incidentally, the plating solution used in the method for producing an aluminum foil of the present invention has an advantage in that the dispersibility of carbonaceous particles is extremely excellent even without adding a dispersant to the plating solution or surface-treating carbonaceous particles to enhance the dispersibility of carbonaceous particles in the plating solution.

The electroplating conditions may be such that, for example, the temperature of the plating solution is 80 to 110° C., and the applied current density is 2 to 15 A/dm². The lower limit of the temperature of the plating solution should be determined in consideration of the melting point of the plating solution. It is preferably 85° C., and more preferably 95° C. (when the temperature is below the melting point of the plating solution, the plating solution solidifies, whereby a plating treatment cannot be performed anymore). Meanwhile, when the temperature of the plating solution is more than 110° C., this may accelerate the reaction between the aluminum film formed on the surface of the substrate and the plating solution, which increases the incorporation of impurities into the aluminum film, resulting in reduced purity. In addition, when the applied current density is less than 2 A/dm², the film formation efficiency may decrease, while when it is more than 15 A/dm², because of the decomposition of a nitrogen-containing compound, etc., it may be impossible to perform a stable plating treatment or obtain a high-ductility, high-purity aluminum foil. The applied current density is preferably 3 to 12 A/dm². A significant advantage of the plating solution used in the method for producing an aluminum foil of the present invention is that a stable plating treatment is possible even when a current density of 10 A/dm² or more is applied, and thus the improvement of the film formation rate can be achieved. Incidentally, the plating treatment time depends on the desired thickness of the aluminum foil, the temperature of the plating solution, the applied current density, and the like, but is usually 1 to 90 minutes (preferably 1 to 30 minutes considering production efficiency). In terms of preventing the deterioration of the plating solution to extend the life, it is preferable that the plating treatment environment is a dry atmosphere.

The substrate for forming an aluminum film (cathode) may be, for example, a stainless steel plate, a titanium plate, an aluminum plate, a nickel plate, or the like. Generally, in order to facilitate the separation of an aluminum film from the substrate, it is preferable that the surface of the substrate is made as smooth as possible by mirror finishing, for example. However, the aluminum film formed on the surface of a substrate by the present invention has a characteristic in that it can be easily separated even without subjecting the substrate to such processing (the reason thereof is not necessarily clear, but is presumably related to the fact that upon the formation of an aluminum film on the surface of a substrate, the concentrations of S and Cl derived from the plating solution increase near the surface of the aluminum film that is in contact with the substrate). Incidentally, as a material for the anode, aluminum can be mentioned, for example. The aluminum film may be separated from the substrate batchwise, or, alternatively, it is also possible to perform the formation and separation of the aluminum film continuously using a cathode drum (e.g., JP-A-6-93490). Incidentally, prior to the separation of the aluminum film from the substrate, it is preferable that the plating solution adhering to the surface of the substrate having the aluminum film formed thereon is washed with water to be removed, followed by drying.

In the method for producing an aluminum foil of the present invention, the aluminum foil thus obtained is subjected to a heat treatment. With respect to the purpose of the heat treatment, the present inventors had the following idea at first. In the case where the plating solution adhering to the surface of the substrate having an aluminum film formed thereon is washed with water to be removed, although moisture is removed by the subsequent drying, if moisture is not sufficiently removed and remains, when such an aluminum foil is used as a positive electrode current collector of an electrical storage device, the properties of the electrical storage device may be adversely affected (destabilization of the electrochemical behavior, etc.); thus, the purpose was to prevent such a problem or to remove the strain in the foil. However, it has been found that when an aluminum foil obtained by electrolysis using the plating solution used in the method for producing an aluminum foil of the present invention is subjected to a heat treatment, totally unexpectedly, tensile strength is improved, and, although this depends on the thickness of the foil, the resulting aluminum foil has a strength of about 170 to 270 N/mm². It has also been found that the improved strength is stably maintained even after exposure to high temperatures and does not substantially change even after heating at 300° C. for 60 minutes, for example. The heat treatment of the aluminum foil may be performed at 80 to 550° C. for 2 to 120 minutes in an atmosphere such as ambient atmosphere, a reduced pressure atmosphere, or an inert gas atmosphere using argon gas or nitrogen gas, for example. When the temperature of the heat treatment is less than 80° C., the effect of the heat treatment may not be sufficiently achieved, while when it is more than 550° C., the temperature of the aluminum foil approaches the melting point of aluminum (660° C.), which may cause the softening of the foil. In addition, when the heat treatment time is less than 2 minutes, the effect of the heat treatment may not be sufficiently achieved, while when it is more than 120 minutes, productivity may be adversely affected. In the light of the above, the temperature of the heat treatment is preferably 100 to 450° C., and more preferably 200 to 350° C. The heat treatment time is preferably 20 to 90 minutes.

According to the method for producing an aluminum foil of the present invention, an aluminum foil having a thickness of 15 μm or less, which has been extremely difficult to produce by rolling at the present time, and also an aluminum foil having a thickness of 10 μm or less, which, without exaggeration, has been almost impossible to produce by rolling, can be produced at a high film formation rate by electrolysis. In addition, the obtained aluminum foil has high ductility and high purity. Further, it has excellent tensile strength, and such strength is stably maintained even after exposure to high temperatures. Specifically, for example, an aluminum foil having an aluminum content of 97.00 to 99.95 mass %, S and Cl contents of 1.50 mass % or less each (normally 0.01 to 0.50 mass %), and a thickness of 1 to 15 μm, which has excellent tensile strength that is stably maintained even after exposure to high temperatures of 100° C. or more (a small amount of inevitable C or O from the ambient may also be contained) can be easily produced with a surface roughness similar to a surface roughness of the substrate (e.g., when the surface roughness Ra of the substrate is 0.1 to 10 μm, the surface roughness Ra of the aluminum foil is about the same). The aluminum foil obtained from the plating solution used in the present invention has a crystal orientation different from a crystal orientation of an aluminum foil produced by rolling or an aluminum foil obtained from the plating solution described in Patent Document 1. That is, a (111) plane has a preferred orientation with respect to the surface of the foil, and the crystal orientation does not substantially change even after a heat treatment (the ratio of the X-ray diffraction intensity of the (111) plane to the X-ray diffraction intensities of other crystal planes, such as (200), (220), (311), and (222) planes, is 2.5 or more). The aluminum foil produced by the present invention can be used, for example, as a thinned positive electrode current collector for providing an electrical storage device with smaller size and higher energy density. The achievement of obtaining an aluminum foil having a surface roughness Ra of about 0.1 to 10 μm corresponding to a surface roughness Ra of a substrate is extremely advantageous in obtaining a positive electrode current collector required to have this surface roughness degree. Incidentally, in the case where the aluminum foil produced by the present invention is used as a positive electrode current collector, in order for the aluminum foil to have excellent tensile strength suitable as a positive electrode current collector, it is preferable that the thickness thereof is 5 μm or more. In addition, the plating solution used in the present invention does not require the addition of an organic solvent, such as benzene or toluene, for increasing the film formation rate. The plating solution is thus advantageous in that it can be washed with water, and also liquid waste disposal is easy.

EXAMPLES

Hereinafter, the present invention will be described in detail with reference to the examples, but the present invention should not be construed by being limited to the following descriptions.

Example 1

Production of Heat-Treated Aluminum Foil

Figure 2:
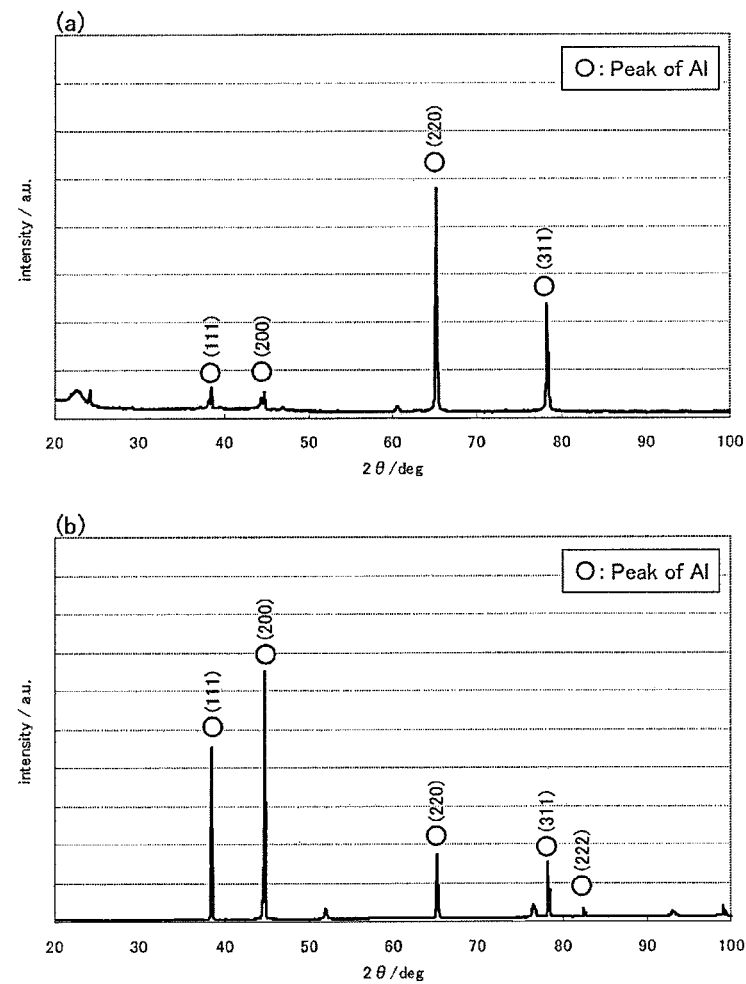
FIG. 2 shows X-ray diffraction charts showing the crystal orientation of an aluminum foil produced by rolling (a) and the crystal orientation of an aluminum foil obtained from the plating solution described in Patent Document 1 (b).
Figure 3:
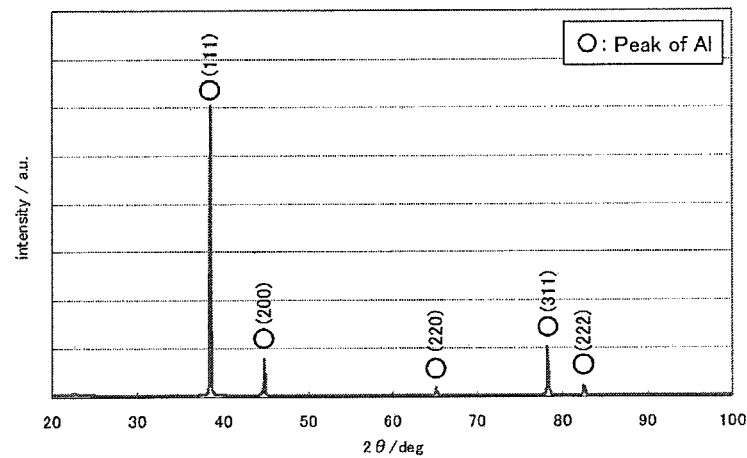
FIG. 3 shows an X-ray diffraction chart showing the crystal orientation of an aluminum foil after a heat treatment in Example 1.
Figure 4:
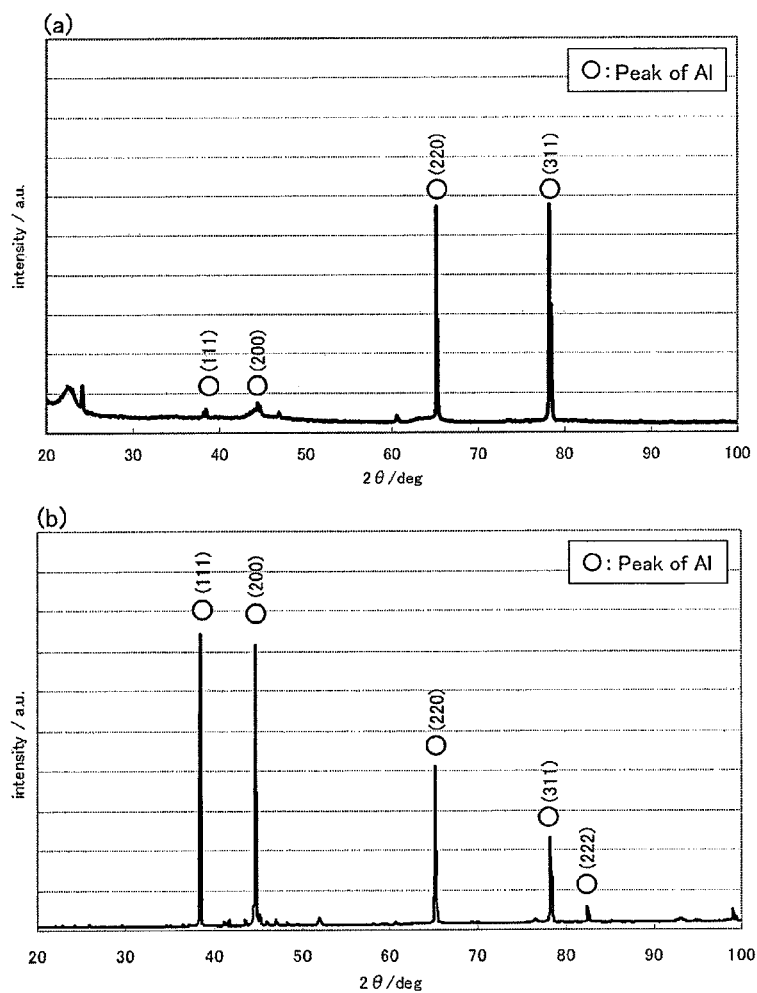
FIG. 4 shows X-ray diffraction charts showing the crystal orientation of a heat-treated aluminum foil produced by rolling (a) and the crystal orientation of a heat-treated aluminum foil obtained from the plating solution described in Patent Document 1 (b).

Dimethyl sulfone, anhydrous aluminum chloride, and trimethylamine hydrochloride were mixed in a molar ratio of 10:3:0.1 and dissolved at 110° C. to prepare an aluminum electroplating solution. Using an aluminum plate having a purity of 99.99 mass % as an anode and a stainless steel plate as a cathode (a substrate for forming an aluminum film), an electroplating treatment was performed for 17 minutes at an applied current density of 3 A/dm$^2$ while stirring the plating solution maintained at 95° C. at a stirring rate of 300 rpm. After 17 minutes, the stainless steel plate having an aluminum film formed on the surface thereof was removed from the plating solution, washed with water, and then dried. Subsequently, from the end portion thereof, forceps were inserted between the aluminum film and the stainless steel plate and moved to slide along the stainless steel plate. As a result, the aluminum film was easily separated from the stainless steel plate to give an aluminum foil. The surface of the obtained aluminum foil was measured for the X-ray diffraction peak using an X-ray diffractometer (D8 ADVANCE: manufactured by Bruker AXS, a θ-2θ method using CuKα ray as the X-ray; the same hereinafter). The results are shown in FIG. 1 ((a) shows measurement results on the front side (the side opposite to the side facing the substrate; the same hereinafter), and (b) shows measurement results on the back side (the side facing the substrate; the same hereinafter)). In addition, the surface of a commercially available aluminum foil having a thickness of 20 μm produced by rolling (manufactured by Nippon Foil Mfg. Co., Ltd.; hereinafter abbreviated as "commercially available rolled toil") and the surface of an aluminum foil obtained from the plating solution described in Patent Document 1 were each measured for the X-ray diffraction peak using an X-ray diffractometer. The results are shown in FIGS. 2 (a) and (b), respectively. As is clear from FIG. 1 and FIG. 2, the aluminum foil obtained from the plating solution used in the present invention had a crystal orientation different from a crystal orientation of the commercially available rolled foil or the aluminum foil obtained from the plating solution described in Patent Document 1, and the (111) plane had a preferred orientation with respect to the surface of the foil. The ratio of the X-ray diffraction intensity of the (111) plane to the X-ray diffraction intensity of the (200) plane (X-ray diffraction intensity of (111) plane/X-ray diffraction intensity of (200) plane) was as high as 12.9 on the front side (almost the same on the back side). The aluminum foil was subjected to a heat treatment in ambient atmosphere at 300° C. for 60 minutes. The cross-sectional structure of the aluminum foil thus obtained was observed under a scanning electron microscope. As a result, it was shown that the crystal structure increases in width from the backside to the front side (widens toward the end) (see Experiment Example 1 below). The obtained aluminum foil had a thickness of 10 μm and high purity (aluminum content: 99.91 mass %, S content: 0.03 mass %, Cl content: 0.06 mass %) and was as ductile as the commercially available rolled foil. Incidentally, the thickness of the aluminum foil was measured by observing the cross-section under a scanning electron microscope (S-800: manufactured by Hitachi, Ltd.) (the same hereinafter). The purity of the aluminum foil was measured as follows. After washing both sides of the aluminum foil with water, the S content was measured using a sulfur analyzer (EMIA-820W: manufactured by Horiba Ltd.), while the Cl content was measured using a wavelength-dispersive X-ray fluorescence spectrometer (RIX-2100: manufactured by Rigaku Corporation), and the remainder was taken as the aluminum content (the same hereinafter). The front side of the heat-treated aluminum foil was measured for the X-ray diffraction peak using an X-ray diffractometer. The results are shown in FIG. 3. In addition, the surface of a commercially available rolled foil after a heat treatment in ambient atmosphere at 300° C. for 60 minutes and the surface of an aluminum foil obtained from the plating solution described in Patent Document 1 after a heat treatment in the same manner were each measured for the X-ray diffraction peak using an X-ray diffractometer. The results are shown in FIGS. 4 (a) and (b), respectively. As is clear from FIG. 2 and FIG. 4, as a result of the heat treatment, the commercially available rolled foil and the aluminum foil obtained from the plating solution described in Patent Document 1 showed substantial changes in the peak pattern. However, as is clear from FIG. 1 and FIG. 3, the aluminum foil obtained from the plating solution used in the present invention showed no substantial change in the peak pattern even after the heat treatment (the ratio of the X-ray diffraction intensity of the (111) plane to the X-ray diffraction intensity of the (200) plane was 7.8). Incidentally, the results of the measurement of the X-ray diffraction peak on the back side of the heat-treated aluminum foil using an X-ray diffractometer were almost the same.

(Effect of Heat Treatment of Aluminum Foil)

Figure 5:
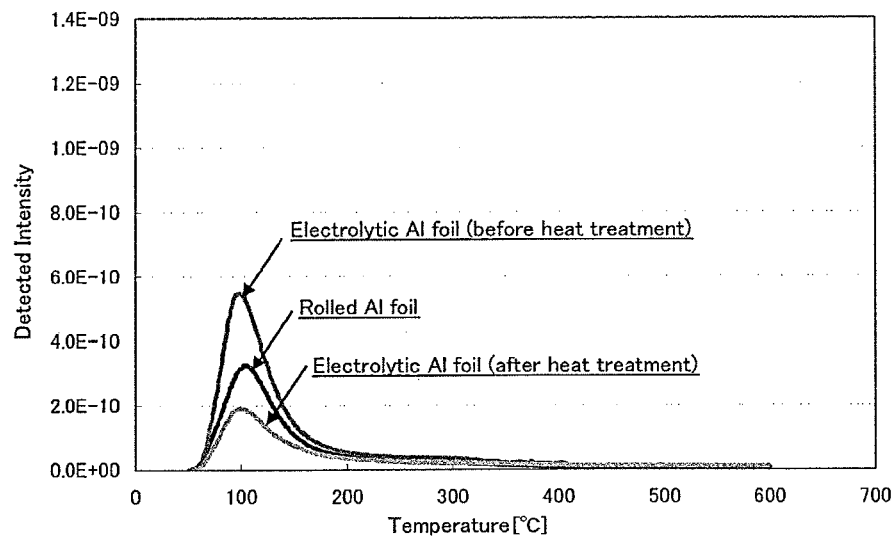
FIG. 5 shows a chart showing the effectiveness of the heat treatment of an aluminum foil in reducing the moisture content of the foil in Example 1.
Figure 6:
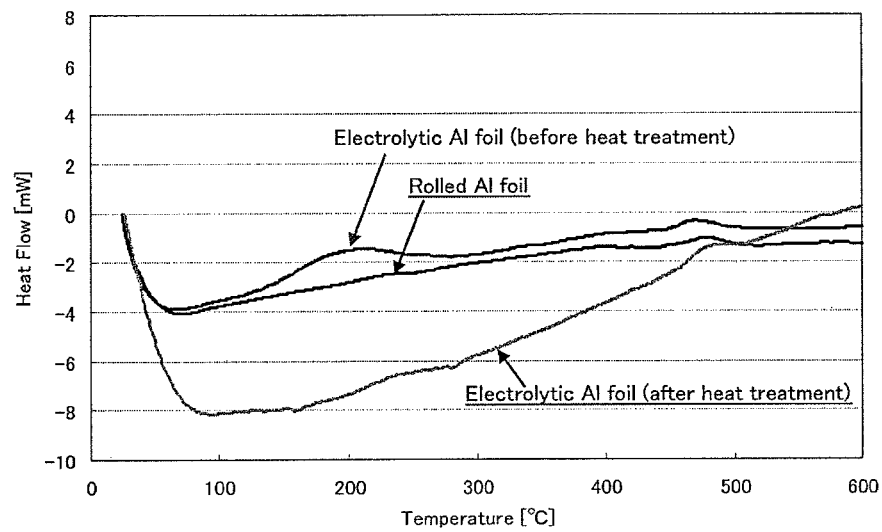
FIG. 6 shows a chart showing the effectiveness in removing the strain of the foil.

The moisture content of the foil was measured before and after the heat treatment using a temperature-programmed desorption gas analyzer (EMD-WA 1000S: manufactured by ESCO, Ltd.; the same hereinafter). The results are shown in FIG. 5 (in the figure, Electrolytic Al foil (before heat treatment/after heat treatment)). Incidentally, FIG. 5 also shows the results of the measurement of the moisture content of the commercially available rolled foil (in the figure, Rolled Al foil). As is clear from FIG. 5, although the moisture content of the foil before the heat treatment was higher than the moisture content of the commercially available rolled foil (47.3 ppm), as a result of the heat treatment, moisture adhering to the surface of the foil was removed, and thus the moisture content of the foil after the heat treatment was lower than the moisture content of the commercially available rolled foil (23.3 ppm). In addition, the foil before and after the heat treatment were subjected to a differential scanning calorimetry using DSC8236 manufactured by Rigaku Corporation. The results are shown in FIG. 6 (in the figure, Electrolytic Al foil (before heat treatment/after heat treatment)). Incidentally, FIG. 6 also shows the results of the differential scanning calorimetry of the commercially available rolled foil (in the figure, Rolled Al foil). As is clear from FIG. 6, in the foil before the heat treatment, an exothermic peak due to the strain in the foil was observed near 200° C. However, as a result of the heat treatment, the strain was removed, and thus almost no such exothermic peak was observed in the foil after the heat treatment. Further, for the evaluation of the tensile strength of the foil before and after the heat treatment, the tensile strength of each foil was measured using a precision universal testing machine (EZTest: manufactured by Shimadzu Corporation; the same hereinafter) in accordance with JIS Z2241, except that the sample foil size was 15×80 mm. As a result, the tensile strength of the foil before the heat treatment was 165 N/mm$^2$, while the tensile strength of the foil after the heat treatment was 240 N/mm$^2$, indicating that the strength of the foil was improved by the heat treatment. This result was surprising considering the fact that usually, when a metal foil is subjected to a heat treatment at about 300° C., the strength of the foil decreases due to the annealing effect. The reason why the heat treatment improves the strength of the foil is not necessarily clear, but is presumably related to the characteristic of the foil mentioned above, i.e., the crystal orientation such that the (111) plane has a preferred orientation with respect to the surface of the foil.

(Applicability of Heat-Treated Aluminum Foil as Positive Electrode Current Collector for Electrical Storage Devices)

Figure 7:
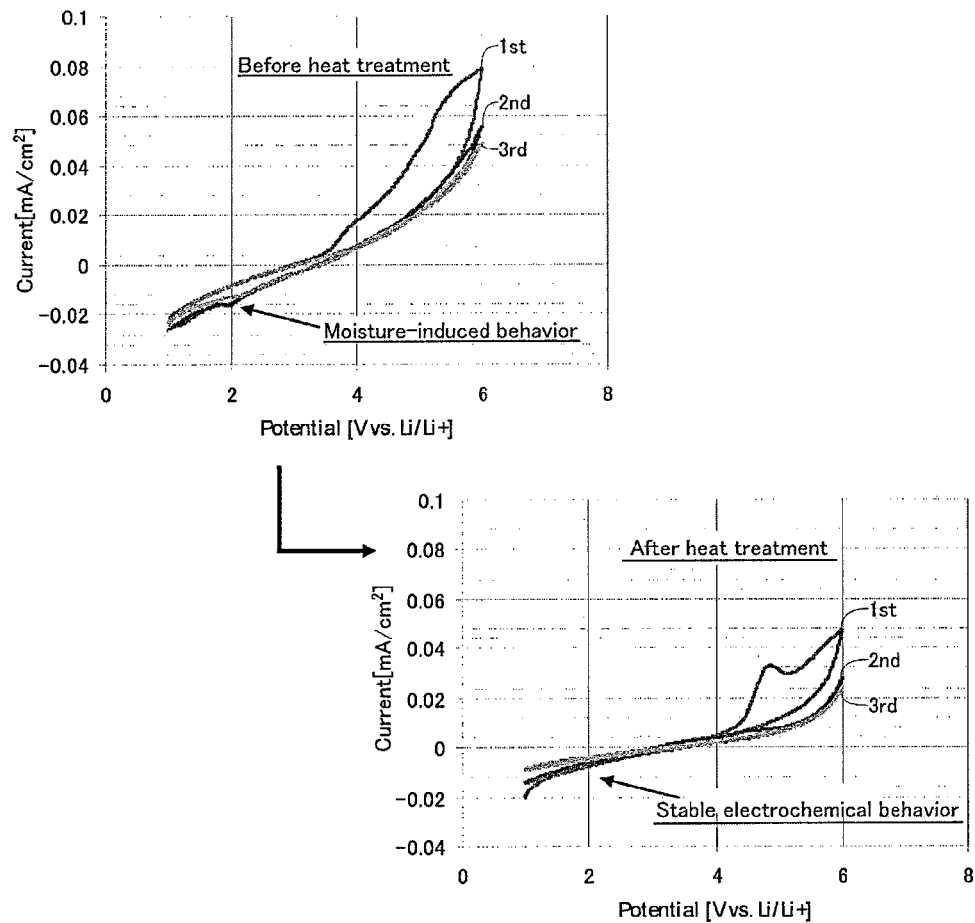
FIG. 7 shows cyclic voltammograms in the case of using an aluminum foil as a test electrode in Example 1 (a foil before and after a heat treatment).

A false battery cell was produced using the foil before or after the heat treatment as a test electrode, a lithium foil as a counter electrode and a reference electrode, and 1 M LiPF$_6$/EC+DMC as an electrolytic solution. Using an electrochemical analyzer (HZ-5000: manufactured by Hokuto Denko Corporation), the false battery cells were subjected to 5 cycles of cyclic voltammetry, and the properties were electrochemically evaluated. The results are shown in FIG. 7 (in the figure, the behaviors in the fourth cycle and the fifth cycle are omitted). As is clear from FIG. 7, in the case where the foil before the heat treatment was used as a test electrode, an unstable behavior due to moisture adhering to the surface of the foil was observed. However, as a result of the heat treatment, moisture adhering to the surface of the foil was removed, and thus in the case where the foil after the heat treatment was used as a test electrode, such an unstable behavior was not observed. The above results show that a heat-treated aluminum foil can be suitably used as a positive electrode current collector for electrical storage devices.

Example 2

A heat-treated aluminum foil was obtained in the same manner as in Example 1, except that the heat treatment was performed in ambient atmosphere at 80° C. for 120 minutes. The heat-treated aluminum foil had high purity (aluminum content: 99.90 mass %, S content: 0.04 mass %, Cl content: 0.06 mass %), and its moisture content was lower than the moisture content of a commercially available rolled foil (21.4 ppm). The crystal orientation was such that the (111) plane had a preferred orientation with respect to the surface of the foil, and the ratio of the X-ray diffraction intensity of the (111) plane to the X-ray diffraction intensity of the (200) plane was as high as 10.8 on the front side (almost the same on the backside). The tensile strength was 210 N/mm$^2$, which is higher than before the heat treatment.

Example 3

Figure 8:
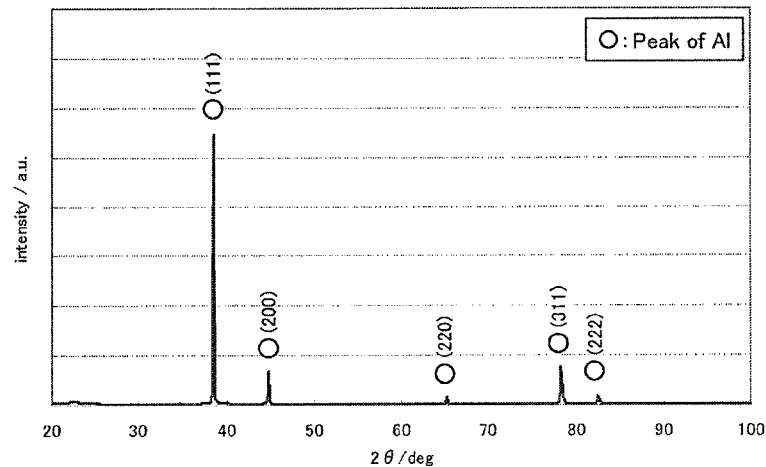
FIG. 8 shows an X-ray diffraction chart showing the crystal orientation of an aluminum foil after a heat treatment in Example 3.

A heat-treated aluminum foil was obtained in the same manner as in Example 1, except that the heat treatment was performed in ambient atmosphere at 500° C. for 5 minutes. The heat-treated aluminum toil had high purity (aluminum content: 99.93 mass %, S content: 0.03 mass %, Cl content: 0.04 mass %), and its moisture content was lower than the moisture content of a commercially available rolled foil (21.4 ppm). The crystal orientation was such that the (111) plane had a preferred orientation with respect to the surface of the foil, and the ratio of the X-ray diffraction intensity of the (111) plane to the X-ray diffraction intensity of the (200) plane was as high as 6.4 on the front side (FIG. 8, almost the same on the back side). The tensile strength was 210 N/mm$^2$, which is higher than before the heat treatment.

Example 4

A heat-treated aluminum foil was obtained in the same manner as in Example 1, except that an electroplating treatment was performed for 9 minutes to give an aluminum foil having a thickness of 5 μm. The purity and moisture content of the heat-treated aluminum foil were almost the same as of the heat-treated aluminum foil obtained in Example 1. The crystal orientation was such that the (111) plane had a preferred orientation with respect to the surface of the foil, and the ratio of the X-ray diffraction intensity of the (111) plane to the X-ray diffraction intensity of the (200) plane was as high as 2.9 on the front side (almost the same on the back side). The tensile strength was 190 N/mm$^2$, which is higher than before the heat treatment.

Example 5

A heat-treated aluminum foil was obtained in the same manner as in Example 1, except that dimethyl sulfone, anhydrous aluminum chloride, and trimethylamine hydrochloride were mixed in a molar ratio of 10:3:2 and dissolved at 110° C. to prepare an aluminum electroplating solution. The purity and moisture content of the heat-treated aluminum foil were almost the same as of the heat-treated aluminum foil obtained in Example 1. The crystal orientation was such that the (111) plane had a preferred orientation with respect to the surface of the foil. The tensile strength was 235 N/mm$^2$, which is higher than before the heat treatment.

Example 6

A heat-treated aluminum foil was obtained in the same manner as in Example 1, except that dimethyl sulfone, anhydrous aluminum chloride, and trimethylamine hydrochloride were mixed in a molar ratio of 10:4:1 and dissolved at 110° C. to prepare an aluminum electroplating solution. The purity and moisture content of the heat-treated aluminum foil were almost the same as of the heat-treated aluminum foil obtained in Example 1. The crystal orientation was such that the (111) plane had a preferred orientation with respect to the surface of the foil. The tensile strength was 238 N/mm$^2$, which is higher than before the heat treatment.

Example 7

A heat-treated aluminum foil was obtained in the same manner as in Example 1, except that dimethyl sulfone, anhydrous aluminum chloride, and trimethylamine hydrochloride were mixed in a molar ratio of 10:1.5:0.01 and dissolved at 110° C. to prepare an aluminum electroplating solution. The purity and moisture content of the heat-treated aluminum foil were almost the same as of the heat-treated aluminum foil obtained in Example 1. The crystal orientation was such that the (111) plane had a preferred orientation with respect to the surface of the foil. The tensile strength was 233 N/mm$^2$, which is higher than before the heat treatment.

Example 8

A heat-treated aluminum foil was obtained in the same manner as in Example 1, except that dimethyl sulfone, anhydrous aluminum chloride, and dimethylamine hydrochloride were mixed in a molar ratio of 10:3:0.05 and dissolved at 110° C. to prepare an aluminum electroplating solution, and that the temperature of the heat treatment was 200° C. The purity and moisture content of the heat-treated aluminum foil were almost the same as of the heat-treated aluminum foil obtained in Example 1. The crystal orientation was such that the (111) plane had a preferred orientation with respect to the surface of the foil. The tensile strength was 225 N/mm$^2$, which is higher than before the heat treatment.

Example 9

Figure 9:
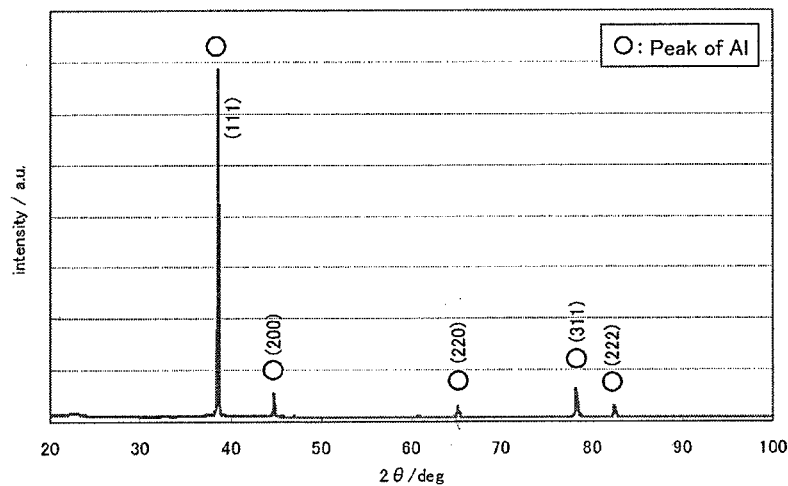
FIG. 9 shows an X-ray diffraction chart showing the crystal orientation of an aluminum foil having acetylene black particles dispersed and supported therein before a heat treatment in Example 9.

Production of Heat-Treated Aluminum Foil Having Acetylene Black Particles Dispersed and Supported Therein Dimethyl sulfone, anhydrous aluminum chloride, and trimethylamine hydrochloride were mixed in a molar ratio of 10:3:0.1 and dissolved at 110° C. to prepare an aluminum electroplating solution. To 200 mL of the plating solution was added 0.1 g of commercially available acetylene black particle aggregates having a size of about 1 μm (carbon content: 98 mass % or more), followed by thorough stirring, thereby giving a plating solution having acetylene black particles uniformly dispersed therein. Using an aluminum plate having a purity of 99.99 mass % as an anode and a titanium plate as a cathode (a substrate for forming an aluminum film), an electroplating treatment was performed for 15 minutes at an applied current density of 5 A/dm$^2$ while stirring the plating solution maintained at 100° C. at a stirring rate of 300 rpm. After 15 minutes, the titanium plate having an aluminum film formed on the surface thereof was removed from the plating solution, washed with water, and then dried. Subsequently, from the end portion thereof, forceps were inserted between the aluminum film and the titanium plate and moved to slide along the titanium plate. As a result, the aluminum film was easily separated from the titanium plate to give an aluminum foil. The surface of the obtained aluminum foil was measured for the X-ray diffraction peak using an X-ray diffractometer. The results are shown in FIG. 9 (measurement results on the front side). As is clear from FIG. 9, also in the case where the plating solution used in the present invention had acetylene black particles dispersed therein, the resulting aluminum foil had a crystal orientation such that the (111) plane had a preferred orientation with respect to the surface of the foil, and the ratio of the X-ray diffraction intensity of the (111) plane to the X-ray diffraction intensity of the (200) plane was as high as 13.0 (almost the same on the back side). The aluminum foil was subjected to a heat treatment in ambient atmosphere at 300° C. for 60 minutes. The aluminum foil thus obtained was observed under a scanning electron microscope. As a result, there were countless acetylene black particles scattering onto the surface of the foil, with some of them being protruded from the surface of the foil, for example, and thus kept exposed to the outside. In addition, the cross-sectional structure was such that the crystal structure increases in width from the back side to the front side (widens toward the end), with the supported acetylene black particles being randomly dispersed in crystal grain or at grain boundary. The surface of the heat-treated aluminum foil having acetylene black particles dispersed and supported therein was measured for the X-ray diffraction peak using an X-ray diffractometer for comparison with the peak pattern before the heat treatment. As a result, there was no substantial change in the peak pattern, and the crystal orientation such that the (111) plane had a preferred orientation with respect to the surface of the foil was maintained even after the heat treatment. The obtained aluminum foil had a thickness of 15 μm (the thickness of the aluminum foil itself) and high purity (the purity of the aluminum foil itself) (aluminum content: 99.91 mass %, S content: 0.03 mass %, Cl content: 0.06 mass %) and was as ductile as a commercially available rolled foil. The amount of acetylene black particles dispersed and supported was 0.15 mass % of the aluminum foil having the acetylene black particles dispersed and supported therein. Incidentally, the amount of acetylene black particles dispersed and supported was measured using a carbon/sulfur analyzer (EMIR-820W: manufactured by Horiba, Ltd.).

(Effect of Heat Treatment of Aluminum Foil Having Acetylene Black Particles Dispersed and Supported Therein)

Figure 10:
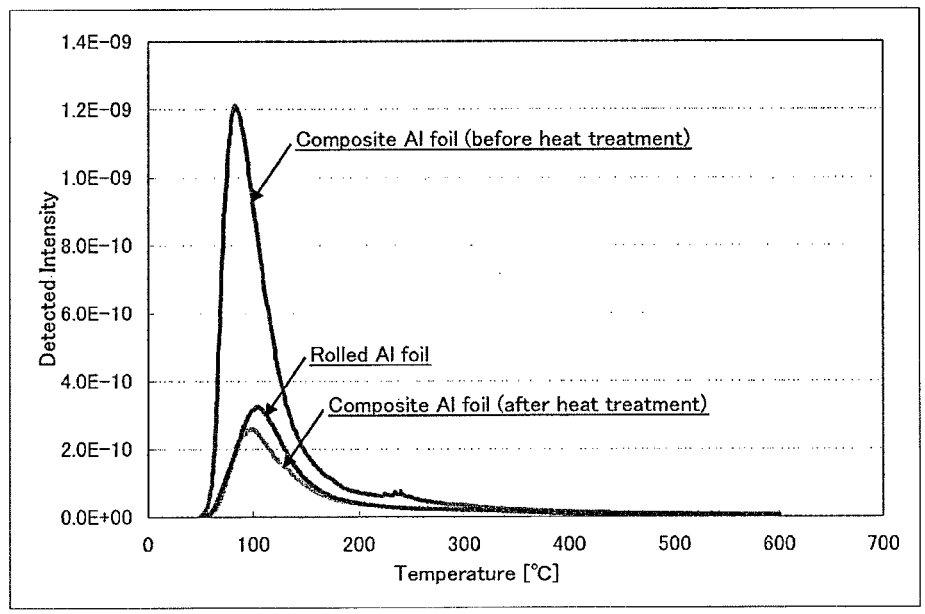
FIG. 10 shows a chart showing the effectiveness of the heat treatment of an aluminum foil having acetylene black particles dispersed and supported therein in reducing the moisture content of the foil in Example 9.

The moisture content of the foil was measured before and after the heat treatment using a temperature-programmed desorption gas analyzer. The results are shown in FIG. 10 (in the figure, Composite Al foil (before heat treatment/after heat treatment)). Incidentally, FIG. 10 also shows the results of the measurement of the moisture content of a commercially available rolled foil (in the figure, Rolled Al foil). As is clear from FIG. 10, although the moisture content of the foil before the heat treatment was much higher than the moisture content of the commercially available rolled foil (81.5 ppm), as a result of the heat treatment, moisture adhering to the surface of the foil was removed, and thus the moisture content of the foil after the heat treatment was lower than the moisture content of the commercially available rolled foil (25.5 ppm). In addition, the foil before and after the heat treatment were subjected to a differential scanning calorimetry in the same manner as in Example 1. As a result, the measurement results were the same as the measurement results of Example 1. Further, for the evaluation of the tensile strength of the foil before and after the heat treatment, the tensile strength of each foil was measured in the same manner as in Example 1. As a result, the tensile strength of the foil before the heat treatment was 200 N/mm$^2$, while the tensile strength of the foil after the heat treatment was 250 N/mm$^2$, indicating that the strength of the foil was improved by the heat treatment.

(Applicability of Heat-Treated Aluminum Foil Having Acetylene Black Particles Dispersed and Supported Therein as Positive Electrode Current Collector for Electrical Storage Devices)

Figure 11:
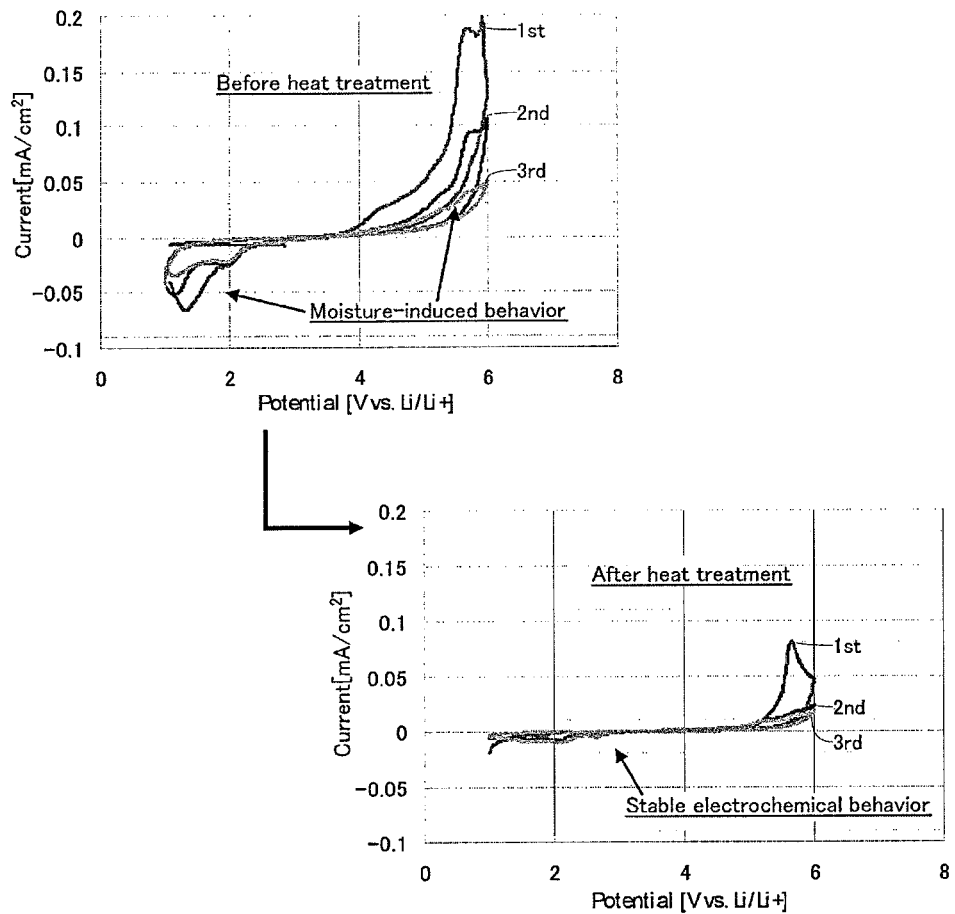
FIG. 11 shows cyclic voltammograms in the case of using an aluminum foil having acetylene black particles dispersed and supported therein as a test electrode in Example 9 (a foil before and after a heat treatment).

In the same manner as in Example 1, the properties of the foil were electrochemically evaluated before and after the heat treatment. The results are shown in FIG. 11 (in the figure, the behaviors in the fourth cycle and the fifth cycle are omitted). As is clear from FIG. 11, in the case where the foil before the heat treatment was used as a test electrode, an unstable behavior due to moisture adhering to the surface of the foil was observed. However, as a result of the heat treatment, moisture adhering to the surface of the foil was removed, and thus in the case where the foil after the heat treatment was used as a test electrode, such an unstable behavior was not observed. The above results show that a heat-treated aluminum foil having acetylene black particles dispersed and supported therein can be suitably used as a positive electrode current collector for electrical storage devices.

Application Example 1

Production and Evaluation of Electrical Storage Device Using Heat-Treated Aluminum Foil as Positive Electrode Current Collector for Electrical Storage Devices (No. 1)

Figure 12:
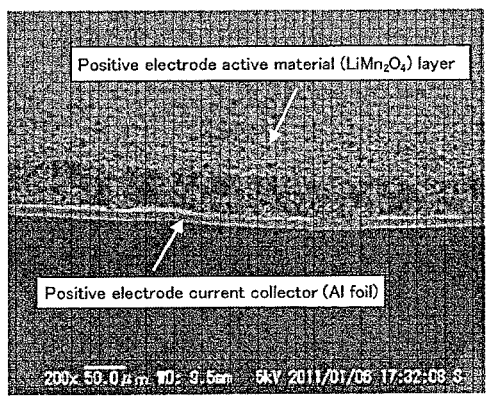
FIG. 12 shows a scanning electron microscope photograph of the cross-section of an electrode produced in Application Example 1 using the heat-treated aluminum foil obtained in Example 1.
Figure 13:
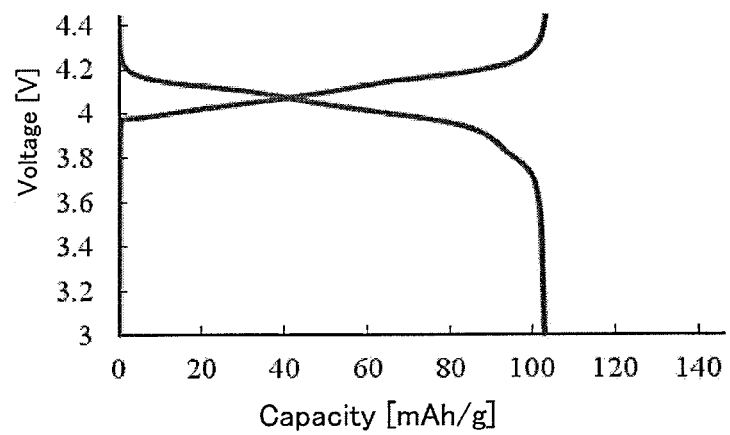
FIG. 13 shows a chart showing the charge-discharge behavior of a charge-discharge test cell produced in Application Example 1 using the heat-treated aluminum foil obtained in Example 1.

The heat-treated aluminum foil obtained in Example 1 was used as a positive electrode current collector. To the surface thereof, a slurry prepared by dispersing a mixture of lithium manganese oxide:acetylene black:polyvinylidene fluoride in a weight ratio of 8:1:1 in N-methylpyrrolidone was applied using a doctor blade, followed by vacuum drying at 80° C. for 24 hours to form a positive electrode active material layer on the surface of the foil. Thus, an electrode having a total thickness of about 50 μm for use in a lithium ion secondary battery was produced. FIG. 12 shows a scanning electron microscope photograph of the cross-section of the electrode thus produced (apparatus: VE-8800 manufactured by Keyence Corporation). Using the electrode as a test electrode, a lithium metal foil as a counter electrode, 1 M lithium hexafluorophosphate/ethylene carbonate+dimethyl carbonate solution (1 M LiPF$_6$/EC+DMC (1:1 by vol.)) as an electrolytic solution, and a polypropylene film as a separator, a charge-discharge test cell was produced using a coin-shaped cell of φ15 mm and subjected to a charge-discharge test at constant current to examine the charge-discharge behavior (charge-discharge rate: 1 C, cutoff potential: 3.0 to 4.5 V). The results are shown in FIG. 13. As is clear from FIG. 13, the charge-discharge curve showed a typical charge-discharge behavior of lithium manganese oxide, and the charge-discharge efficiency was 99% or more. This shows that the heat-treated aluminum foil obtained in Example 1 can be suitably used as a positive electrode current collector for electrical storage devices.

Application Example 2

Production and Evaluation of Electrical Storage Device Using Heat-Treated Aluminum Foil as Positive Electrode Current Collector for Electrical Storage Devices (No. 2)

Figure 14:
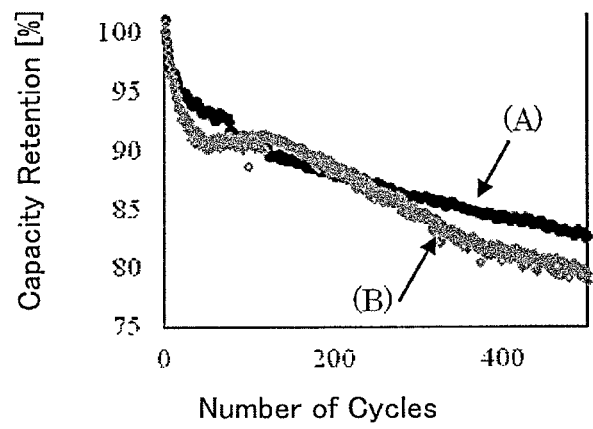
FIG. 14 shows a chart showing the discharge capacity retention of a charge-discharge test cell produced using the heat-treated aluminum foil obtained in Example 8 and the discharge capacity retention of a charge-discharge test cell produced using a commercially available rolled foil after charge-discharge cycles in Application Example 2.

A charge-discharge test cell was produced in the same manner as in Application Example 1, except that the heat-treated aluminum foil obtained in Example 8 (surface roughness Ra on the front side: 0.35 μm (almost the same on the back side), measured using an ultra-depth shape measuring microscope VK-8510 manufactured by Keyence Corporation; the same hereinafter) was used as a positive electrode current collector. In addition, a charge-discharge test cell was produced in the same manner as in Application Example 1, except that a commercially available rolled foil (Ra=0.08 μm) was used as a positive electrode current collector. The charge-discharge test cells produced were each subjected to a charge-discharge test in the same manner as in Application Example 1 to examine the discharge capacity retention after charge-discharge cycles. The results are shown in FIG. 14. As is clear from FIG. 14, as compared with the charge-discharge test cell (B) produced using a commercially available rolled foil, the charge-discharge test cell (A) produced using the heat-treated aluminum foil obtained in Example 8 showed excellent discharge capacity retention even after high cycles. This shows that the heat-treated aluminum foil obtained in Example 8 can be suitably used as a positive electrode current collector for electrical storage devices. This result is presumably attributed to that the heat-treated aluminum foil obtained in Example 8 has a rough surface as compared with the commercially available rolled foil and thus has excellent adhesion to a positive electrode active material, and, accordingly, the separation between the positive electrode current collector and the positive electrode active material, which is generally caused by repeated charging and discharging, was reduced.

Experiment Example 1

Figure 15:
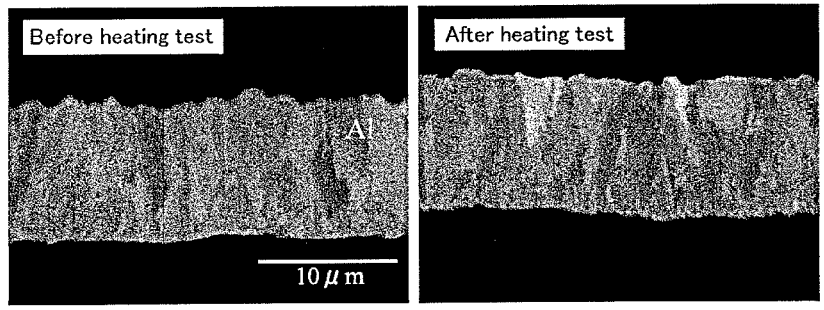
FIG. 15 shows scanning electron microscope photographs showing the cross-sectional structural configuration of the heat-treated aluminum foil obtained in Example 1 and the cross-sectional structural configuration of the heat-treated commercially available rolled foil before and after a heating test in Experiment Example 1.
Figure 15:
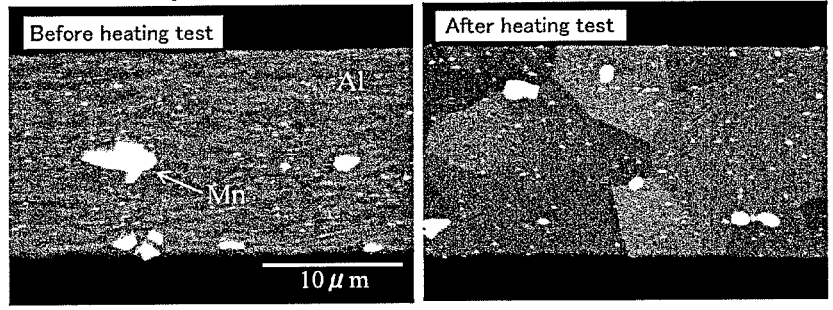

Evaluation of Thermal Stability of Tensile Strength of Heat-Treated Aluminum Foil The heat-treated aluminum foil obtained in Example 1 was subjected to heating tests for 60 minutes at various temperatures in ambient atmosphere, and, for the evaluation of tensile strength after the heating tests, tensile strength was measured in the same manner as in Example 1. The results are shown in Table 1. Incidentally, a commercially available rolled foil was subjected to the heating tests in the same manner, and then tensile strength was measured in the same manner as in Example 1. The results are also shown in Table 1. As is clear from Table 1, as a result of the heat treatment, the tensile strength of the heat-treated aluminum foil obtained in Example 1 was higher than before the heat treatment (as described in Example 1). This tensile strength had excellent stability against subsequent heating, and, even after the heating test at 500° C., the tensile strength decreased only slightly. Meanwhile, in the commercially available rolled foil, a significant decrease in tensile strength was observed after the heating test at 200° C., indicating poor stability against subsequent heating. With respect to the heat-treated aluminum foil obtained in Example 1 and the commercially available rolled foil, the cross-sectional structural configuration of each foil was observed under a scanning electron microscope (S-4300: manufactured by Hitachi, Ltd.) before the heating test and after the heating test at 300° C. The results are shown in FIG. 15. As is clear from FIG. 15, in the commercially available rolled foil, the crystal grains grew as a result of the heating test, and the structural configuration was significantly different between before and after the heating test (in the figure, Mn is an additional metal component). In contrast, the heat-treated aluminum foil obtained in Example 1 had a unique structural configuration in which the crystal structure increases in width from the back side to the front side (widens toward the end), and this structural configuration did not substantially change even after the heating test. The reason why the heat-treated aluminum foil obtained in Example 1 has improved the strength of the foil as a result of the heat treatment, and its stability against subsequent heating is excellent, is presumably related also to such a structural configuration in addition to the above-described crystal orientation in which the (111) plane has a preferred orientation with respect to the surface of the foil.

TABLE 1

| | Before Heating | | Tensile Strength (N/mm²) | | | | |
|---|---|---|---|---|---|---|---|
| | | | After Heating at 100° C. | After Heating at 200° C. | After Heating at 300° C. | After Heating at 400° C. | After Heating at 500° C. |
| Heat-Treated Electrolytic Al Foil | 165 (before heat treatment) | 238 (after heat treatment) | 237 | 234 | 240 | 210 | 207 |
| Commercially Available Rolled Al Foil | 210 | | 212 | 164 | 130 | 65 | 40 |

INDUSTRIAL APPLICABILITY

The present invention makes it possible to provide a method for producing a high-purity aluminum foil that allows a positive electrode current collector to be thinned for providing an electrical storage device with smaller size and higher energy density, and also has excellent tensile strength that is stably maintained even after exposure to high temperatures. In this respect, the present invention is industrially applicable.

The invention claimed is:

1. A method for producing an aluminum foil, comprising the steps of:
   forming an aluminum film on a surface of a substrate by electrolysis using a plating solution containing at least (1) a dialkyl sulfone, (2) an aluminum halide, and (3) a nitrogen-containing compound;
   separating the film from the substrate to obtain an aluminum foil; and
   subjecting the obtained foil to a heat treatment,
   wherein the heat treatment is conducted in an ambient atmosphere, and wherein the ambient atmosphere is at a temperature of 80 to 550° C.

2. A production method according to claim 1, wherein the dialkyl sulfone is dimethyl sulfone.

3. An aluminum foil characterized by being produced by the method of claim 1.

4. An aluminum foil according to claim 3, characterized by having an aluminum content of 97.00 to 99.95 mass %, S and Cl contents of 1.50 mass % or less each, and a thickness of 1 to 15 μm.

5. An aluminum foil according to claim 3, characterized by having a crystal orientation such that the ratio of the X-ray diffraction intensity of a (111) plane to the X-ray diffraction intensities of other crystal planes is 2.5 or more with respect to a surface of the foil.

6. A positive electrode current collector for electrical storage devices, characterized by comprising the aluminum foil of claim 3.

7. An electrode for electrical storage devices, characterized by comprising an electrode active material supported on the aluminum foil of claim 3.

8. An electrical storage device, characterized by comprising the electrode for electrical storage devices of claim 7.

9. A production method according to claim 1, characterized in that the nitrogen-containing compound is at least one selected from the group consisting of an ammonium halide, a hydrogen halide salt of a primary amine, a hydrogen halide salt of a secondary amine, a hydrogen halide salt of a tertiary amine, and a quaternary ammonium salt represented by the general formula: $R^1R^2R^3R^4N.X$ ($R^1$ to $R^4$ independently represent an alkyl group and are the same as or different from one another, and X represents a counteranion for the quaternary ammonium cation).

* * * * *